(12) United States Patent
Lin et al.

(10) Patent No.: US 7,748,850 B2
(45) Date of Patent: Jul. 6, 2010

(54) COOLING DEVICE FOR LIGHT SOURCE OF PROJECTOR

(75) Inventors: Chia-Jui Lin, Taipei (TW); Hsiu-Ming Chang, Taipei (TW)

(73) Assignee: Delta Electronics, Inc., Taoyuan (TW)

( * ) Notice: Subject to any disclaimer, the term of this patent is extended or adjusted under 35 U.S.C. 154(b) by 656 days.

(21) Appl. No.: 11/325,838

(22) Filed: Jan. 5, 2006

(65) Prior Publication Data

US 2006/0152684 A1    Jul. 13, 2006

(30) Foreign Application Priority Data

Jan. 10, 2005    (TW) ............................... 94200494 U

(51) Int. Cl.
*G03B 21/16* (2006.01)
(52) U.S. Cl. ............................... 353/57; 353/58; 353/61
(58) Field of Classification Search .................. 353/52, 353/53, 54, 55, 56, 57, 58, 59, 60, 61
See application file for complete search history.

(56) References Cited

U.S. PATENT DOCUMENTS

| | | | |
|---|---|---|---|
| 1,831,762 A * | 11/1931 | Blohm | 353/60 |
| 6,203,159 B1 * | 3/2001 | Takizawa | 353/61 |
| 6,758,583 B2 * | 7/2004 | Hsu et al. | 362/373 |
| 6,976,760 B2 * | 12/2005 | Ito et al. | 353/61 |
| 7,014,322 B2 * | 3/2006 | Okoshi | 353/61 |
| 7,073,912 B2 * | 7/2006 | Yanagisawa et al. | 353/61 |
| 7,210,825 B2 * | 5/2007 | Watanabe et al. | 362/373 |
| 7,237,906 B2 * | 7/2007 | Morimoto et al. | 353/61 |
| 7,393,109 B2 * | 7/2008 | Arboix | 353/57 |
| 2003/0076683 A1 * | 4/2003 | Chang | 362/294 |
| 2004/0145896 A1 * | 7/2004 | Watanabe et al. | 362/294 |
| 2004/0169825 A1 * | 9/2004 | Ozawa et al. | 353/61 |
| 2005/0052625 A1 * | 3/2005 | Davis et al. | 353/98 |
| 2008/0036978 A1 * | 2/2008 | Hsu et al. | 353/85 |

* cited by examiner

*Primary Examiner*—Georgia Y Epps
*Assistant Examiner*—Danell L Owens
(74) *Attorney, Agent, or Firm*—Volpe and Koenig, P.C.

(57) ABSTRACT

An improved projector device and the cooling device therefor are provided. The provided projector device includes a light source including a lead wire, a first foil having a first front-end and a first rear-end, and a second foil having a second front-end and a second rear-end, and includes a first blower configured on a first side of the light source and generating a first air to cool the bulb portion and the second foil of the light source, and a second blower configured on a second side of the light source and generating a second air to cool the lead wire as well as the first foil.

14 Claims, 7 Drawing Sheets

COOLING DEVICE FOR LIGHT SOURCE OF PROJECTOR

FIELD OF THE INVENTION

The present invention relates to a cooling device for the light source of the projector, and in particular to a cooling device for the projector with a high power light source.

BACKGROUND OF THE INVENTION

The projector is popularized in various applications, including the multimedia conference, the data projecting and displaying, and the commercial application such as the projector screen or television, for immediately showing the desired image during the presentation. The projector is principally constructed of a light source, i.e. the bulb, an optical system and a power system. The optical system is configured for processing the lights transmitting from the light source and projecting to an external screen. The power system is configured for providing the projector with driving power.

In order to display a clear image on a larger projecting screen for more people, it needs to arrange a relatively high power bulb inside the projector. The high power bulb configured in the projector, however, would generate a greater amount of heat and result in a relatively high temperature while in operation, and thereby the operation of the other components of the projector would be reversely influenced. Furthermore, the high temperature as well as the great amount of heat produced by the bulb also reduces the life cycle thereof, which may increase the use cost for the projector. Accordingly, the cooling technique is always an important issue for improving the projector and reducing the cost thereof.

Please refer to FIG. 1, which is a diagram showing the interior arrangement of a conventional cooling device for the light source of the projector according to the prior art, as illustrated in the U.S. Pat. No. 6,203,159. A pair of exhaust fans 16' are provided side by side in a line at positions corresponding to the exhaust port (not shown) of the rear case 5' of the projector 1'. The exhaust fans 16' introduce the cooling air drawn by three associated intake fans (not shown), so as to exhaust the hot air generated in the projector 1'. Through such configuration, a portion of the cooling air would flow into the projector 1' through the opening 9022' so as to cool the rear side of the light source 8', and a portion of the cooling air would flow into the housing portion 9021' so as to cool the front side of the light source 8'. In this case, the entire light source 8' is provided with a desired cooling effect.

Nevertheless, the mentioned configuration still has some disadvantages. When the cooling air flows from the opening 9024' into the housing portion 9021', a large portion thereof will directly flow out the rear case 5' along the housing portion 9021', owing to the flow-guiding effect provided by the fans 16'. In this case, even the rotation rate of the fans 16' is further increased, there is still only a quite small portion of cooling air that could flow into and thus cool the bulb portion which is always regarded as the dominating heat source of the light source 8'. Accordingly, such conventional cooling device for the light source of the projector needs to be improved due to the poor cooling effect for the bulb portion.

FIG. 2 is a diagram illustrating the interior arrangement of a further conventional cooling device for the light source of the projector according to the prior art, as illustrated in the U.S. Pat. No. 6,758,583. The cooling device 2' configured to cooling a light source 10' includes two axial-flow exhaust fans 20' and 30' attached to the case 50', and also includes a blower 40' installed in the projector. The exhaust fan 20' is located adjacent to the front end of the light source 10' and the other exhaust fan 30' is located adjacent to the rear end of the light source, where the hot airstream generated in the case is exhausted by the two exhaust fans 20' and 30', and the cooling air would be directed to the light source 10' by the blower 40'.

In this case, the exhaust fans 20' and 30' operate only for exhausting the hot airstream from the case 50'. The blower 40' is configured inside the projector and tends to provide a direct cooling effect for the bulb portion 11' of the light source 10'. Since the blower 40', however, is not specifically associated and configured with the light source 10', a partition plate 70' needs to be further configured between the exhaust portion of the blower 40' and the light source 10', so as to direct the cooling air. Accordingly, it is easily conceived that some portion of cooling air would still fail to effectively blow to the bulb portion 11' of the light source 10'.

Furthermore, it is worthy to notice that the great amount of heat is not only produced by the bulb portion 11', but also by the lead wire and foils of the light source. Hence it is so difficult to optimize the cooling effect for the bulb portion and the lead wire as well by adjusting only a single blower, since the bulb portion and the lead wire are so sensitive to the angle and direction of the blowing air. Accordingly, the mentioned conventional cooling device is disadvantageous in the difficulty in practice and the relatively poor cooling effect.

Based on the mentioned, it is necessary for each components of the light source of the projector to be individually cooled, so as to improve the life cycle and the lightening quality thereof. The conventional cooling device, however, fails in such demand so far.

For overcoming the mentioned drawbacks of the conventional cooling device for the light source of the projector, a novel configuration of cooling device therefor is provided in the present invention. The provided cooling device includes two blowers individually arranged on the respective sides of the light source, whose exhaust portions are aimed to the lead wire as well as the foil and the bulb portion, respectively, so as to provided an excellent cooling effect therefor.

SUMMARY OF THE INVENTION

In accordance with a first aspect of the present invention, an improved projector device is provided. The provided projector device includes a light source including a lead wire, a first foil having a first front-end and a first rear-end, and a second foil having a second front-end and a second rear-end, and includes a first blower configured on a first side of the light source and generating a first air, and a second blower configured on a second side of the light source and generating a second air.

According to the first aspect of the present invention, the first air blows and cools the first rear-end and the second front-end.

According to the mentioned first aspect of the present invention, the second air blows and cools the lead wire and the first front-end.

Preferably, the lead wire is clad in the first and second foils, and the first rear-end and the second front-end form a bulb portion thereof.

Preferably, the light source further includes a covering, so as to locate the lead wire, the first foil and the bulb portion in a first region defined thereby, and locate the second rear-end in a second region defined thereby.

Preferably, the first blower and the second blower are configured in the first region.

Preferably, the first blower includes a first duct, and thereby the first air is directed to the bulb portion and the second foil.

Preferably, the light source further includes a covering, so as to locate the lead wire, the first foil and the bulb portion in a first region defined thereby, and locate the second rear-end in a second region defined thereby.

Preferably, the first blower and the second blower are configured in the first region.

Preferably, the second blower includes a second duct, and thereby the second air is directed to the lead wire and the first front-end.

Preferably, the light source further includes a covering, so as to locate the lead wire, the first foil and the first rear-end and the second front-end in a first region defined thereby, and locate the second rear-end in a second region defined thereby.

Preferably, the first blower and the second blower are configured in the first region.

In accordance with a second aspect of the present invention, a cooling device for a light source of a projector is provided. The light source includes a lead wire, a first foil having a first front-end and a first rear-end, and a second foil having a second front-end and a second rear-end. The provided cooling device includes a first blower configured on a first side of the light source and generating a first air, and a second blower configured on a second side of the light source and generating a second air.

Preferably, the lead wire is clad in the first and second foils, and the first rear-end and the second front-end form a bulb portion thereof.

Preferably, the light source further includes a covering, so as to locate the lead wire, the first foil and the bulb portion in a first region defined thereby, and locate the second rear-end in a second region defined thereby.

Preferably, the first blower and the second blower are configured in the first region.

Preferably, the first blower includes a first duct, and thereby the first air is directed to the bulb portion and the second foil.

Preferably, the second blower includes a second duct, and thereby the second air is directed to the lead wire and the first front-end.

The foregoing and other features and advantages of the present invention will be more clearly understood through the following descriptions with reference to the drawings, wherein:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5(A) and 5(B) illustrate the simulation for flow field of the cooling air provided by the cooling device according to the preferred embodiment of the present invention, and the color and the length of each arrow indicate the temperature and the flow rate of the air flow. This type of simulation scheme would be known to a person of ordinary skill in the art. Nevertheless, for clarity, the red arrow represents an airflow at a relatively higher temperature and the blue one represents an airflow at a relatively lower one. Moreover, the airflow with a relatively higher flow rate is represented by an arrow with a relatively large length and vice versa.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
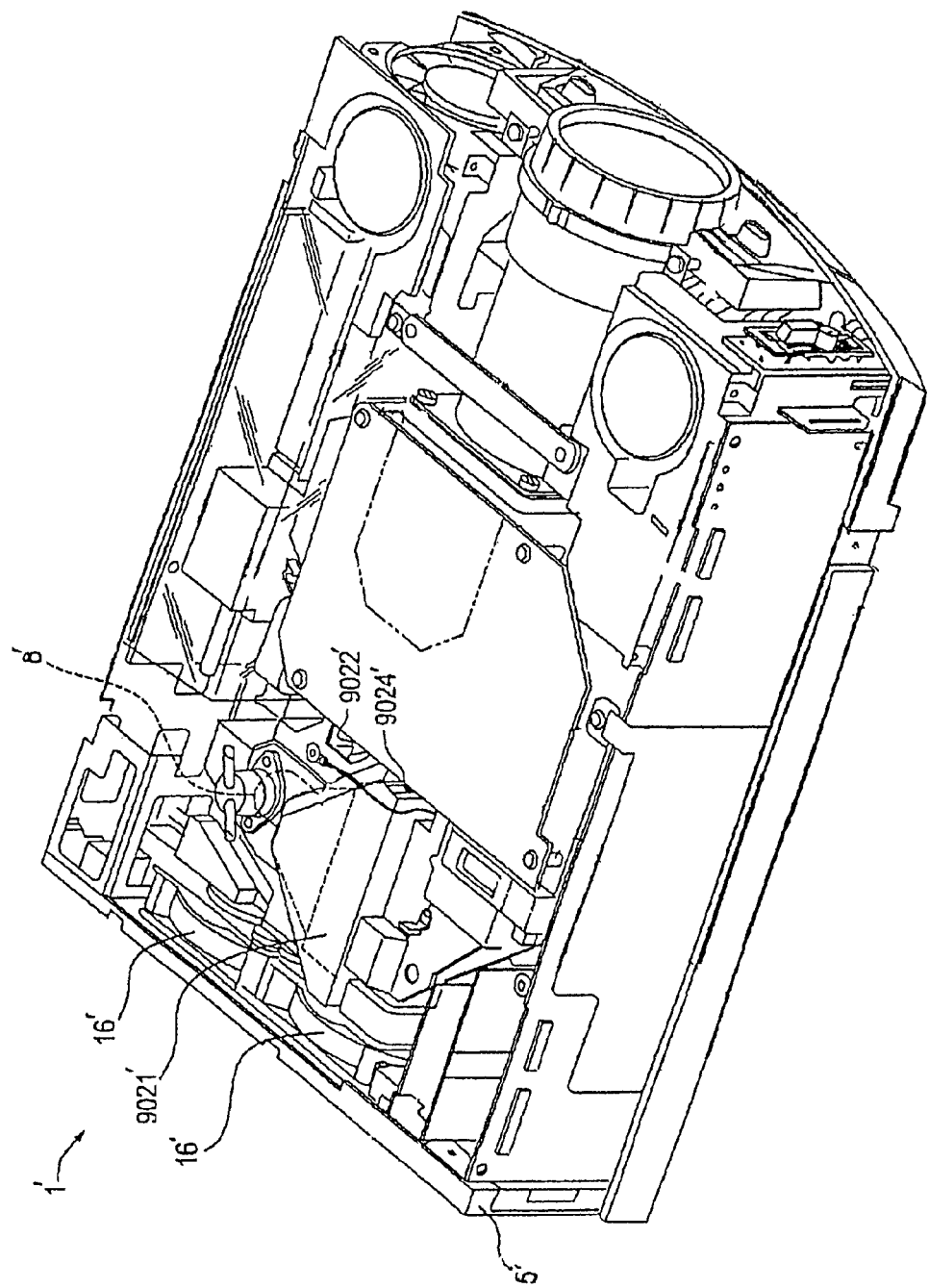
FIG. 1 is a diagram illustrating the interior arrangement of a conventional cooling device for the light source of the projector according to the prior art.
Figure 2:
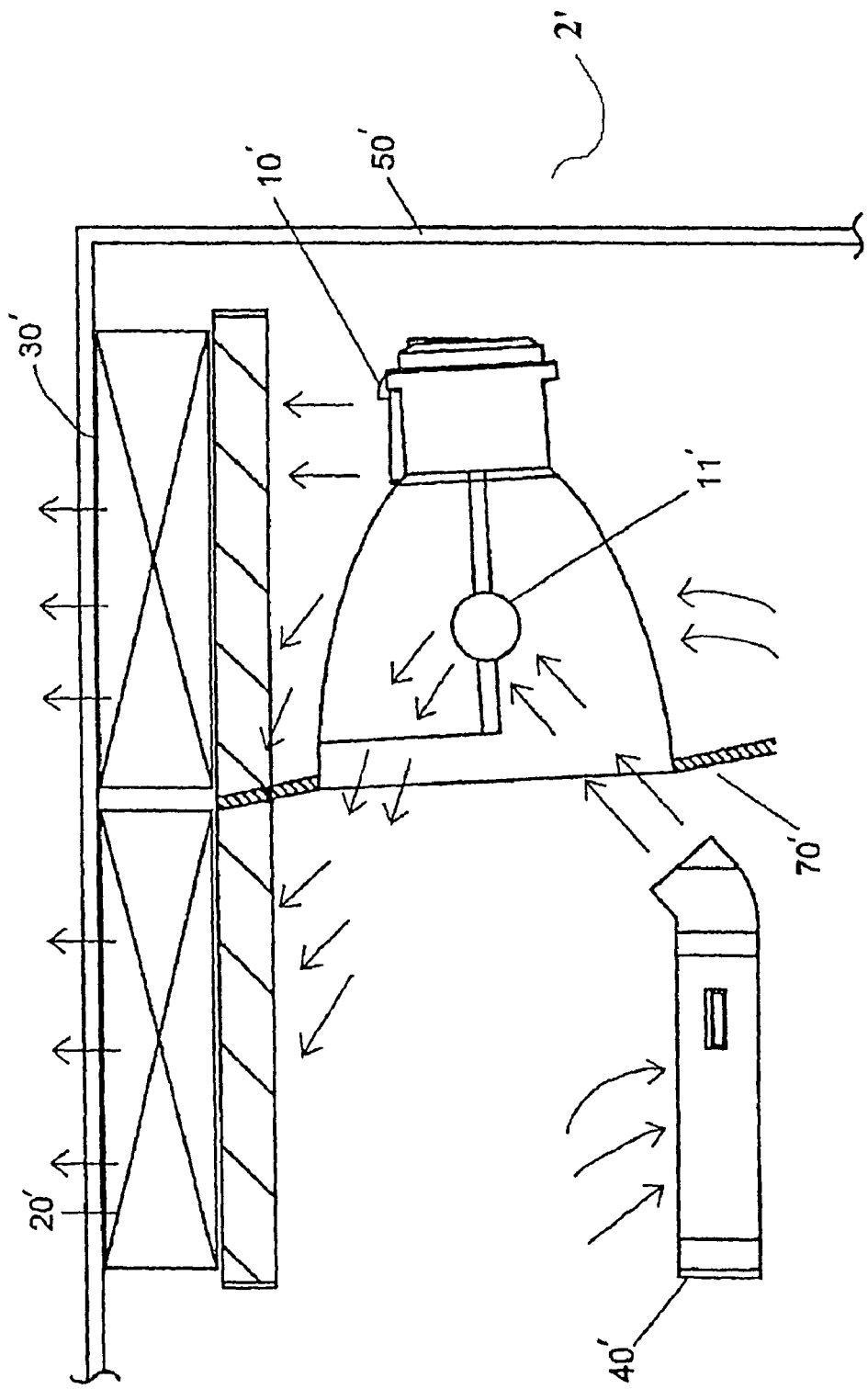
FIG. 2 is a diagram illustrating the interior arrangement of a further conventional cooling device for the light source of the projector according to the prior art.
Figure 3:
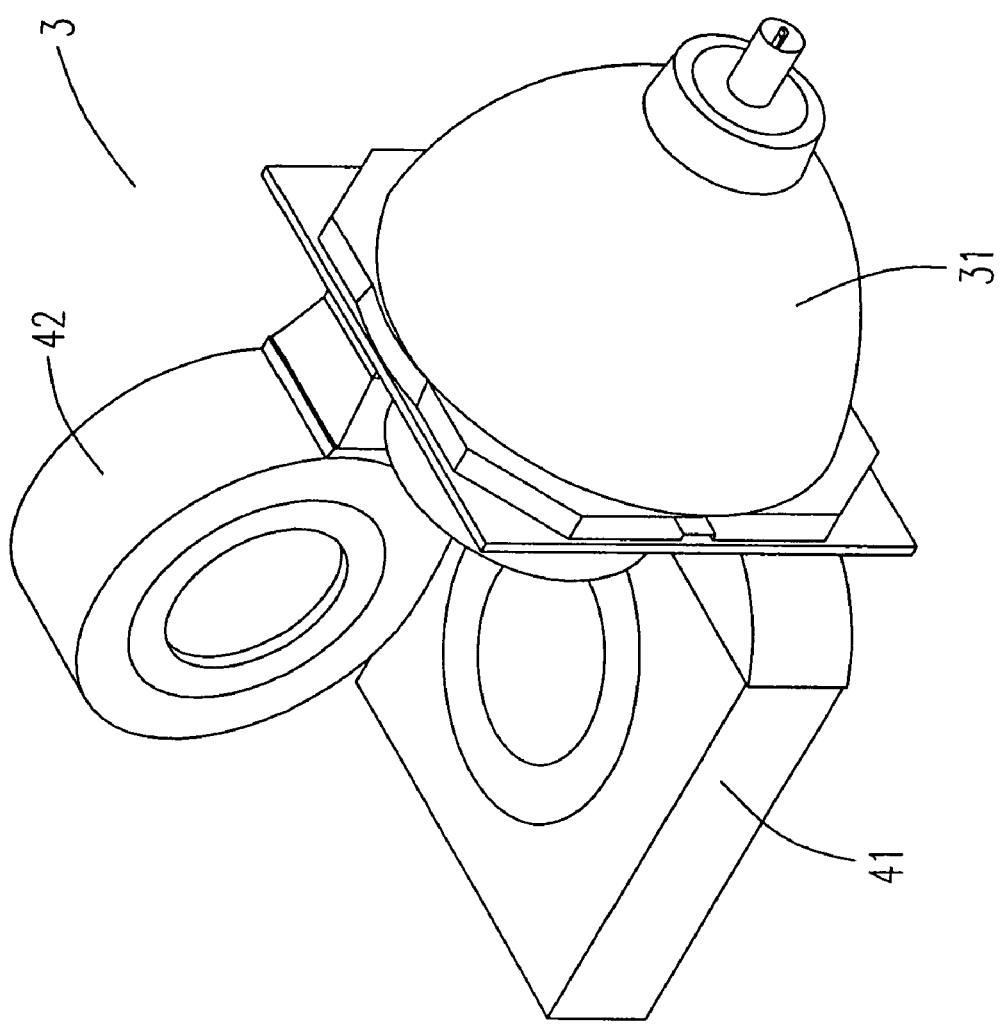
FIG. 3 is a stereo view for schematically illustrating the configuration of a cooling device for the light source of the projector according to a preferred embodiment of the present invention.

Please refer to FIG. 3, which is a stereo view for schematically illustrating the configuration of a cooling device for the light source of the projector according to a preferred embodiment of the present invention. The present invention provides an improvement in the cooling device for the light source of the projector. The provided cooling device 3 for the light source 31 of the projector principally includes a first blower 41 and a second blower 42, where the first blower 41 and the second blower 42 are respectively configured on the both sides of the light source 31, and cool the respective portions thereof.

Figure 4A:
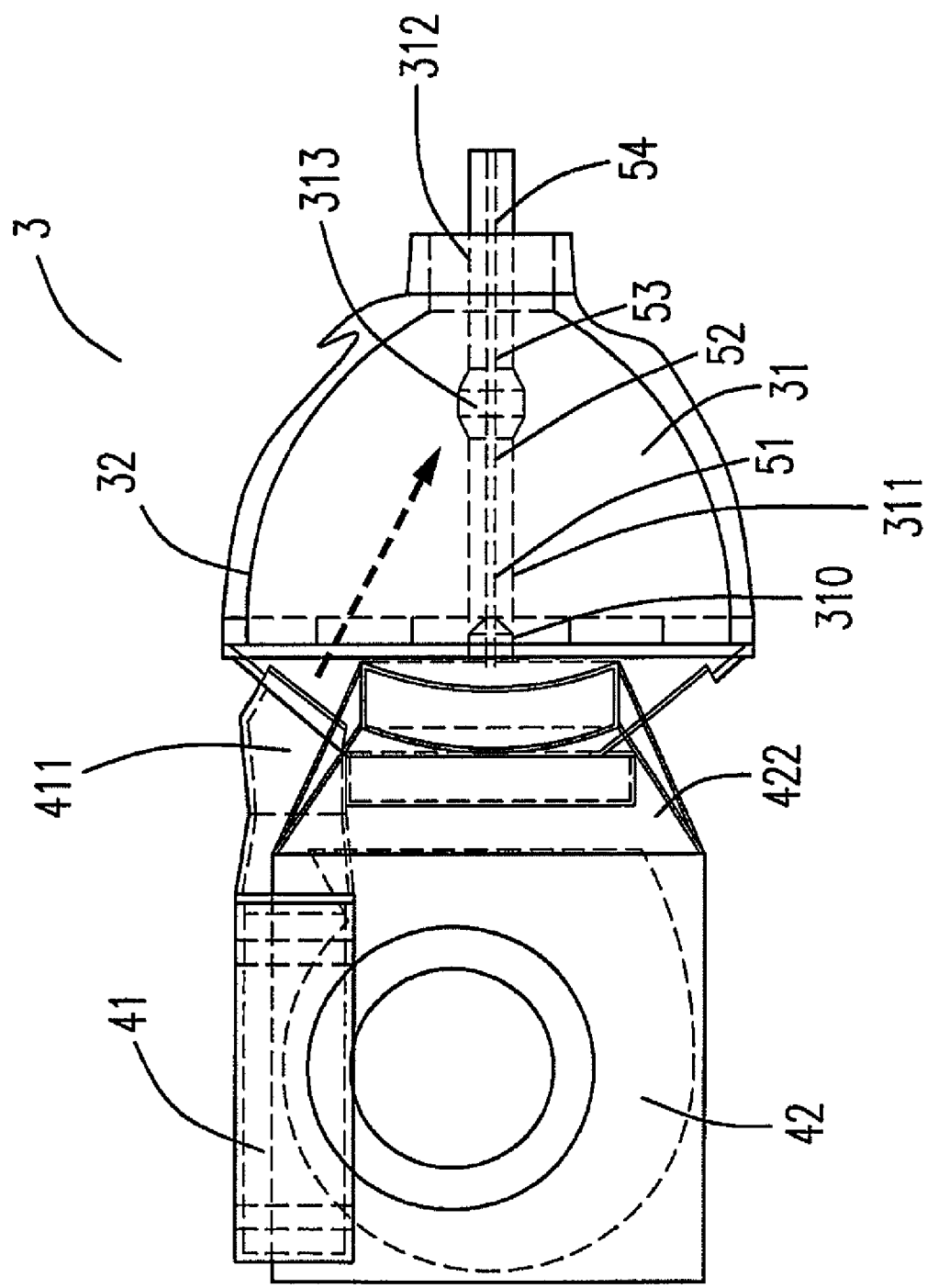
FIGS. 4(A) and 4(B) are the respective top view and side view for illustrating the configuration of the cooling device for the light source of the projector according to FIG. 3.
Figure 4B:
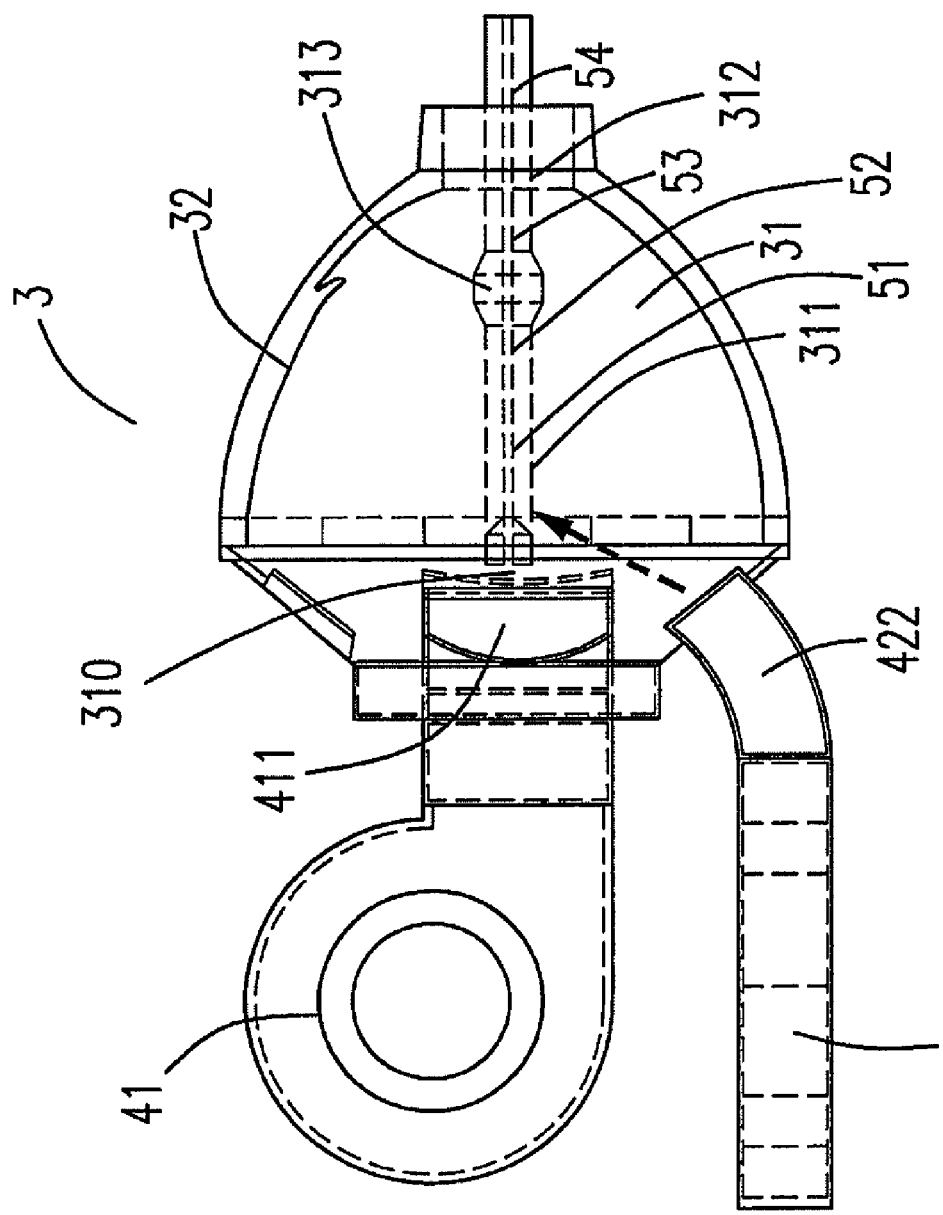

Please refer to FIGS. 4(A) and 4(B), which are the respective top view and side view for illustrating the configuration of the cooling device for the light source of the projector according to FIG. 3. The light source 31 is constructed of a lead wire 310, a front foil 311 and a back foil 312, where the rear-end of the front foil 311 and the front-end of the back foil 312 form the so-called bulb portion 313 of the light source 31. The cooling device 3 further includes a reflector covering 32, where the lead wire 310, the front foil 311 and the bulb portion 313 are arranged on one side of the reflector covering 32, and the rear-end of the back foil 312 is arranged on the other side thereof.

Moreover, the first duct 411 is further associated with the first blower 41, whereby the cooling air generated by the first blower 41 is directed to blow the bulb portion 313 as well as the back foil 312, so as to specifically cool the bulb portion 313 and the back foil 312 of the light source 31, as shown by the arrow in FIG. 4(A). Furthermore, the second blower 42 also includes a second duct 422 associated therewith. The second duct 422 is aimed to the lead wire 310 and the front foil 311, so as to direct the cooling air generated by the second blower 42 to the lead wire 310 as well as the front foil 311 of the light source 31, as shown by the arrow in FIG. 4(B).

Figure 5A:
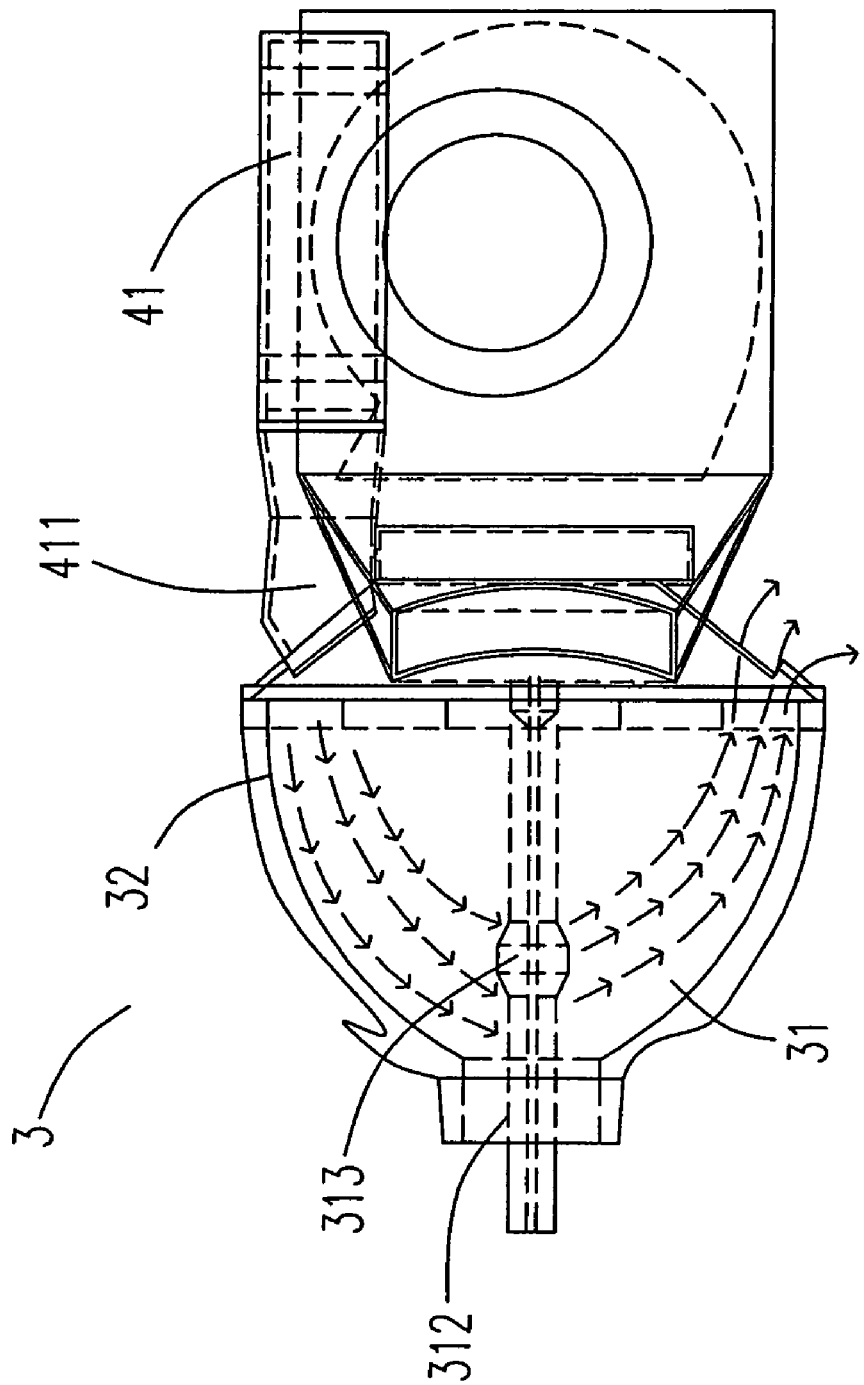
FIGS. 5(A) and 5(B) are diagrams illustrating the simulation for flow field of the cooling air provided by the cooling device according to the preferred embodiment of the present invention.
Figure 5B:
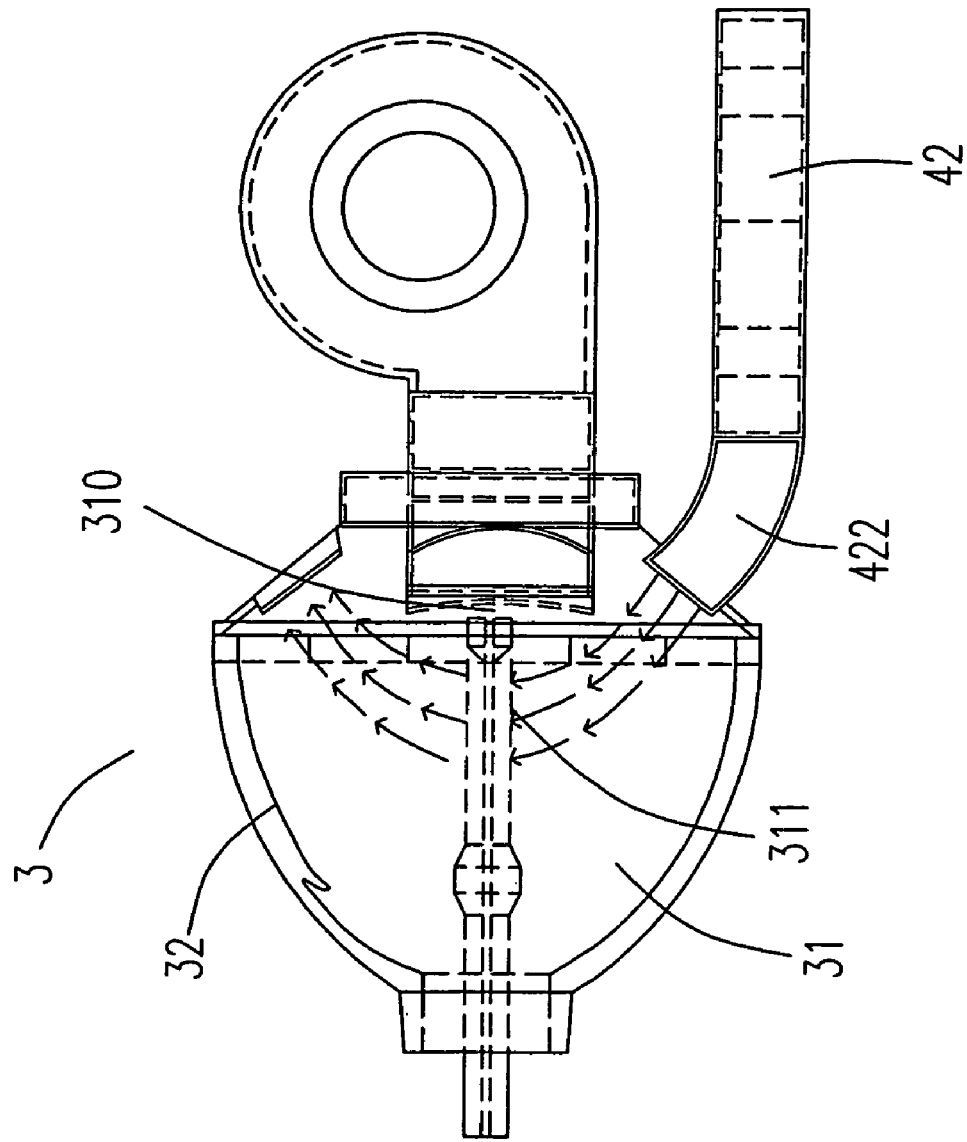

Please refer to FIGS. 5(A) and 5(B), showing the simulation for flow field of the cooling air provided by the cooling device according to the preferred embodiment of the present invention, where the direction and magnitude of the respective arrows represent the flow direction and speed of the cooling air. FIG. 5(A) and FIG. 5(B) respectively reveal the distribution of each component of the cooling air generated by the first blower, blower #1, and the second blower, blower

2. Based on the simulation result as shown in FIG. 5(A), it is apparent that the cooling air A generated by the first blower according to the present invention indeed blows to the bulb portion as well as the back foil of the light source specifically. Based on the simulation result as shown in FIG. 5(B), moreover, it is apparent that the cooling air B generated by the second blower according to the present invention indeed blows to the lead wire as well as the front foil of the light source specifically.

According to the present invention, the improved cooling device for the light source of the projector provides a more sufficient cooling effect for the heat source including the bulb portion and the lead wire as well as the foils that generates a great amount of heat and results in a high temperature configured inside the projector. In comparison with the conventional cooling device, the present invention provides the respective cooling effect for not only the lead wire and the front foil but also the back foil and the bulb portion of the light source by means of a respective exclusive blower configured therefor. Accordingly, the difficulty in optimizing the cooling effect brought by a single blower or fan for the bulb portion as well as the lead wire of the conventional projector is well improved. Certainly, the cooling device for the light source of the projector according to the present invention is also flexible to be associated with the configuration of the conventional projector in which the fan is arranged external the housing thereof, so as to provide an enhanced cooling therefor.

In addition, the present invention is more advantageous in that the production of noise could be efficiently prevented even the power of the light source is increased. This is because that the two blowers effectively share the loading and well cooperate by the novel design according to the present invention. Therefore, the present invention not only has a novelty and a progressiveness, but also has an industry utility.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A projector device, comprising:
   a light source including a lead wire, a first foil having a first front-end and a first rear-end, and a second foil having a second front-end and a second rear-end;
   a first blower configured on a first side of said light source, having a first duct directed to said first rear-end and said second front-end and generating a first air; and
   a second blower configured on a second side of said light source, having a second duct directed to said lead wire and said first front-end and generating a second air,
   wherein said first air passes through said first duct and blows and cools said first rear-end and said second front-end, and said second air passes through said second duct and blows and cools said lead wire and said first front-end.

2. The projector device according to claim 1, wherein said lead wire is clad in said first and second foils, and said first rear-end and said second front-end form a bulb portion thereof.

3. The projector device according to claim 2, wherein said light source further includes a covering, so as to locate said lead wire, said first foil and said bulb portion in a first region defined thereby, and said second rear-end in a second region defined thereby.

4. The projector device according to claim 3, wherein said first blower and said second blower are configured in said first region.

5. The projector device according to claim 2, wherein said first air is directed to said bulb portion and said second foil.

6. The projector device according to claim 5, wherein said light source further includes a covering, so as to locate said lead wire, said first foil and said bulb portion in a first region defined thereby, and said second rear-end in a second region defined thereby.

7. The projector device according to claim 6, wherein said first blower and said second blower are configured in said first region.

8. The projector device according to claim 1, wherein said light source further includes a covering, so as to locate said lead wire, said first foil and said first rear-end and said second front-end in a first region defined thereby, and said second rear-end in a second region defined thereby.

9. The cooling device according to claim 8, wherein said first blower and said second blower are configured in said first region.

10. A cooling device for a light source of a projector, wherein said light source comprises a lead wire, a first foil having a first front-end and a first rear-end, a second foil having a second front-end and a second rear-end, and a covering, so as to locate said lead wire in a first region defined thereby and said second rear-end in a second region defined thereby, said cooling device comprising:
    a first blower configured on a first side of said light source, having a first duct directed to said first rear-end and said second front-end and generating a first air; and
    a second blower configured on a second side of said light source, having a second duct directed to said lead wire and said first front-end and generating a second air;
    wherein said first blower and said second blower are configured in said first region.

11. The cooling device according to claim 10, wherein said lead wire is clad in said first and second foils, and said first rear-end and said second front-end form a bulb portion thereof.

12. The cooling device according to claim 11, wherein said first foil and said bulb portion are located in said first region.

13. The cooling device according to claim 1, wherein said bulb portion and said second foil.

14. The cooling device according to claim 10, wherein said first air passes through said first duct and blows and cools said first rear-end and said second front-end, and said second air passes through said second duct and blows and cools said lead wire and said first front-end.

* * * * *